United States Patent
Hawkes et al.

(10) Patent No.: US 7,809,620 B2
(45) Date of Patent: *Oct. 5, 2010

(54) TAX MANAGED BUY-WRITE FUND

(75) Inventors: James B. Hawkes, Boston, MA (US); Thomas E. Faust, Boston, MA (US)

(73) Assignee: Eaton Vance Management, Boston, MA (US)

( * ) Notice: Subject to any disclaimer, the term of this patent is extended or adjusted under 35 U.S.C. 154(b) by 1191 days.

This patent is subject to a terminal disclaimer.

(21) Appl. No.: 11/284,205

(22) Filed: Nov. 21, 2005

(65) Prior Publication Data

US 2007/0118450 A1   May 24, 2007

(51) Int. Cl.
*G06Q 40/00* (2006.01)
(52) U.S. Cl. ............................ 705/35; 705/36 T
(58) Field of Classification Search .............. 705/10–44
See application file for complete search history.

(56) References Cited

U.S. PATENT DOCUMENTS

| | | | |
|---|---|---|---|
| 5,193,056 A | 3/1993 | Boes | |
| 5,784,696 A | 7/1998 | Melnikoff | |
| 5,806,048 A | 9/1998 | Kiron et al. | |
| 6,088,685 A | 7/2000 | Kiron et al. | |
| 6,115,697 A | 9/2000 | Gottstein | |
| 6,615,188 B1 | 9/2003 | Breen et al. | |
| 6,832,209 B1 | 12/2004 | Karp et al. | |
| 6,879,964 B2 | 4/2005 | Sauter et al. | |
| 2003/0225657 A1 | 12/2003 | Whaley et al. | |
| 2003/0225658 A1 | 12/2003 | Whaley | |
| 2005/0234797 A1 | 10/2005 | Schwartz | |

OTHER PUBLICATIONS

Rampart Investment Management; Rampart BXM Strategy;undated, downloaded Jan. 19, 2005; pp. 1-5.
Chicago Board Options Exchange; "Cover Call Writers, Have You Been Looking for a Performance Benchmark?"; Aug. 20, 2002; pp. 1-2; downloaded Jan. 19, 2005.
Chicago Board Options Exchange; "Who Should Consider Using Covered Calls?"; Jan. 2003; pp. 1-6; downloaded Jan. 19, 2005.

*Primary Examiner*—Frantzy Poinvil
(74) *Attorney, Agent, or Firm*—Sampson & Associates, P.C.

(57) ABSTRACT

A system and method is provided for administering a tax-managed, buy-write investment fund having a plurality of units available for sale to the public. An index representing a first portfolio of assets having desired performance characteristics is identified. A second portfolio of assets is configured to have performance characteristics similar to those of the index, while having less than 70 percent overlap therewith. Shares of the second portfolio are purchased, while call options against the index are written.

26 Claims, 2 Drawing Sheets

TAX MANAGED BUY-WRITE FUND

BACKGROUND

1. Technical Field

This invention relates to a system and method for investment of funds, and more particularly to an investment vehicle that utilizes covered-call options in a tax-advantaged manner to reduce downside investment risk while also reducing adverse tax consequences relative to other conventional investment vehicles.

2. Background Information

Throughout this application, various publications, patents and published patent applications are referred to by an identifying citation. The disclosures of the publications, patents and published patent applications referenced in this application are hereby incorporated by reference into the present disclosure.

Hedging may be defined as the purchase or sale of a security, derivative (such as options or futures and the like) or other instrument in order to reduce or neutralize all or some portion of the risk of holding another security or other underlying asset. Hedging equities is an investment approach that can alter the payoff profile of an equity investment through the purchase and/or sale of options or other derivatives. Hedged equities are usually structured in ways that mitigate the downside risk of an equity position, albeit at the cost of some of the upside potential.

A buy-write hedging strategy generally is considered to be an investment strategy in which an investor buys a stock or a basket of stocks, and simultaneously sells or "writes" call options that correspond to the stock or basket of stocks. An option can be defined as a contract between two parties in which one party has the right but not the obligation to do something, usually to buy or sell some underlying asset at a given price, called the exercise price, on or before some given date. Options have been traded on the Chicago Board Options Exchange since 1973. Call options are contracts giving the option holder the right to buy something, while put options, conversely, entitle the holder to sell something. A covered call option is a call option that is written against a securities position (such as, for example, a stock or a basket of stocks and the like) or other asset (such as, for example, financial futures, commodities and the like) held by the option seller.

Buy-write strategies provide option premium income that can help cushion downside moves in an equity (asset) portfolio; thus, some buy-write strategies significantly outperform stocks when stock prices fall. Buy-write strategies have an added attraction to some investors in that buy-writes tend to help lessen the overall volatility in many portfolios.

Indexes have been devised to track the return of certain buy-write strategies. Such indexes are discussed in U.S. Patent Application Publication No. 2003/0225658 to Whaley. One such exemplary buy-write index is the Chicago Board Options Exchange S&P 500® BuyWrite Index(sm) (the BXM Index) which is a benchmark index designed to track the performance of a hypothetical buy-write strategy consisting of owning the stocks in the S&P 500® and writing a series of one-month call options on the full value of the index.

Taxation is a significant concern to investors and others who are evaluating capital investment transactions such as buying or selling a stock. A transaction that yields a certain before-tax profit may prove less profitable after taxes are assessed. Similarly, a transaction that produces a financial loss may actually prove to be less of a loss when realized tax losses are used to offset taxes on capital gains realized on other investments.

Frequently an investment is sold to re-invest the proceeds in another potentially more profitable capital investment vehicle, and so not merely to liquidate profits. However, the consequences of selling a currently held investment instrument to buy an alternate instrument can only be accurately evaluated by knowing the tax consequences of the transaction. This is particularly true under most capital gain taxation regimes because different, usually lower, tax rates are applied when the investment is held for longer periods. Under some capital gains tax laws the tax rate may be reduced after a specified holding period, such as 1 year.

One known method that attempts to solve the capital gains tax problem is a low turn-over strategy, where investments are on average held for sufficient periods to qualify for long-term capital gains treatment.

Such a long term holding strategy tends to militate against use of a buy-write strategy, since the premium received from writing covered-call options on individual assets generally gives rise to capital gain or loss taxed at higher, short-term rates. In addition, conventional straddle rules may further penalize such hedging techniques from a tax standpoint. Accordingly, a need exists for a system or method for providing a financial instrument which utilizes a buy-write strategy while also minimizing the adverse tax consequences of such an approach.

SUMMARY

In an aspect of the present invention, a method is provided for administering a tax-managed, buy-write investment fund having a plurality of units available for sale to the public. The method includes identifying an index representing a first portfolio of assets having desired performance characteristics, and configuring a second portfolio of assets having performance characteristics similar to, but having less than 70 percent overlap with, those of the first portfolio. The method further includes purchasing shares of the second portfolio, and writing index call options against the first portfolio.

Another aspect of the invention includes a computer-implemented system for administering a tax-managed, buy-write investment fund. The system includes first and second portfolio identification (ID) modules configured to identify an index representing a first portfolio of assets having desired characteristics, and to identify a second portfolio of assets having characteristics similar to those of the first portfolio. A portfolio comparator is configured to ensure the second portfolio has less than 70 percent overlap with the first portfolio. A purchase module is configured to direct the purchase of shares of the second portfolio, and a write module is configured to direct the writing of index call options against the first portfolio.

In a still further aspect, a tax-managed buy-write financial instrument includes a fund configured to hold shares of a second asset portfolio configured to emulate performance, while having less than 70 percent overlap with, an index representing a first asset portfolio. The fund is configured to serially write index call options against the index, wherein subsequent index call options are written upon expiration of previous index call options. The second asset portfolio includes Qualified Dividend Income (QDI)-paying assets, so that the fund is configured to serially purchase the QDI-paying assets prior to dividend distribution, and to hold the QDI-paying assets for time periods predetermined to enable receipt of the QDI and to obtain federal income taxation at rates applicable to long term capital gains thereon. The fund is also configured to systematically harvest tax losses generated by the sale of the QDI-paying assets.

An aspect of the invention also includes an article of manufacture for administering a tax-managed, buy-write investment fund, including a computer usable medium having a computer readable program code embodied therein. The computer readable program code is configured for identifying an index representing a first portfolio of assets having desired performance characteristics, and for configuring a second portfolio of assets having performance characteristics similar to those of the first portfolio, while having less than 70 percent overlap with the first portfolio. Program code is also provided to purchase shares of the second portfolio and to write index call options against the first portfolio.

BRIEF DESCRIPTION OF THE DRAWINGS

The above and other features and advantages of this invention will be more readily apparent from a reading of the following detailed description of various aspects of the invention taken in conjunction with the accompanying drawings, in which.

DETAILED DESCRIPTION

Figure 1:
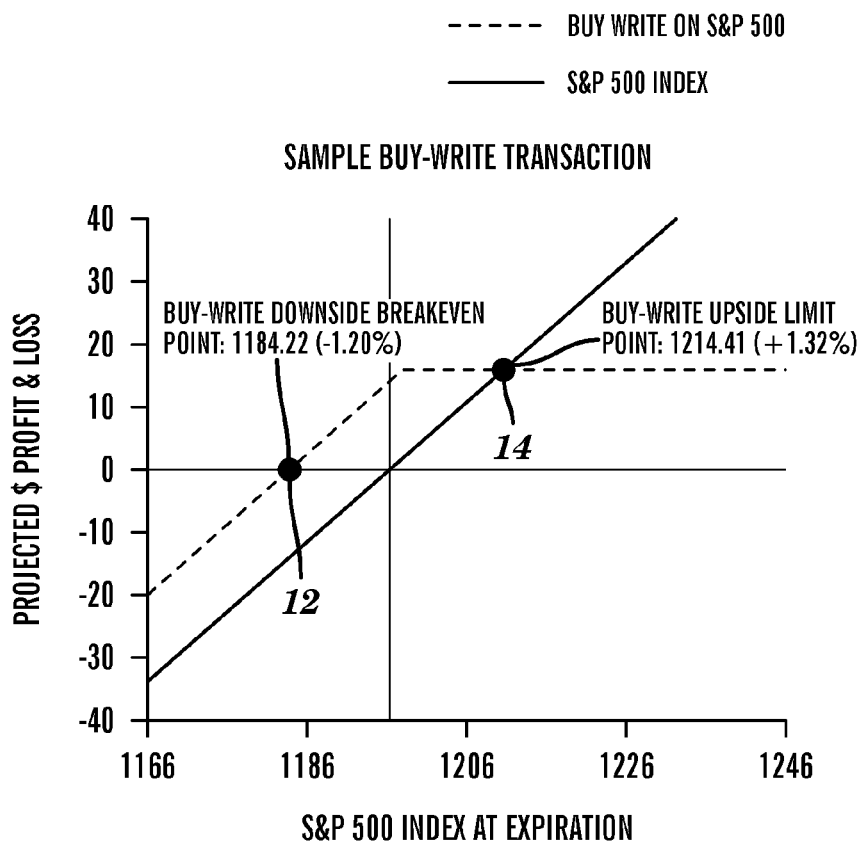
FIG. 1 is a graphical representation of a conventional buy-write transaction.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings are indicated with like reference numerals and similar features as shown in alternate embodiments in the drawings are indicated with similar reference numerals. Herein, the following terminology is used:

An investor is a person or business entity that opens an account for the purposes of investing in stocks, securities or other financial instruments.

The term "computer" is meant to encompass one or more workstation, personal computer, personal digital assistant (PDA), wireless telephone, or any other suitable computing device, which may be coupled to one another using links that may include one or more local area networks (LANs), metropolitan area networks (MANs), wide area networks (WANs), the Internet, or any other appropriate wireline, wireless, or other links. The components of embodiments of the present invention may operate on one or more computers at one or more locations, according to particular needs.

A security or financial instrument is any one of a number of ownership interests including common stock, preferred stock, bonds, notes, bills, options (puts and calls), futures, warrants, mutual fund shares, or any other type of ownership interests typically issued or traded in units such as shares.

An issuer is a company, partnership or other business or personal entity that issues securities that can be purchased by investors.

Referring to Figures, an embodiment of the financial system according to the principles of the present invention is shown and described. In a particular embodiment, system 10 is used to operate and manage an open-end fund or closed-end trust series in the form of a mutual fund having shares available for purchase by an investor, configured to seek after-tax income and gains by implementing a tax-managed, buy-write strategy.

Embodiments of system 10 may be implemented in one or more computers, in various hardware and operating environments known to those skilled in the art. These embodiments are thus not limited to any type of computer(s). Elements of the systems and methods embodying the present invention may be programmed in any suitable language and technology, such as, Hypertext Markup Language (HTML), Active ServerPages (ASP), JavaScript, C++; Visual Basic; Java; VBScript; Jscript; BCMAscript; and XML. Any suitable database technology can be employed, including, but not limited to: Microsoft Access and IMB AS 400.

Briefly, embodiments of the present invention include a system for creating and managing a tax-managed buy-write financial instrument, such as in the form of an open-end or closed-end fund, such as a closed-end fund or a mutual fund, i.e., an open-end trust series having a plurality of units available for sale to the public. This system is configured to execute (and/or enable one to execute) buy-write (covered call) transactions, in a tax-advantaged manner, as will be discussed in greater detail hereinbelow. The system thus directs the purchase of a portfolio of stocks predetermined to perform similarly to a conventional stock index, and the tax-advantaged writing of related index call options.

By way of background, those skilled in the art will recognize that the writer of an option receives an initial cash payment (premium) in exchange for agreeing to sell the underlying stock at a specified exercise price on or before the specified option expiration date (or, for cash-settled index options, agreeing to pay cash to the extent that the index exceeds the exercise price on the option valuation date.) The premium received adds to returns, but at a cost of capping upside potential of the stocks on which the options are written. This aspect may be best understood with reference to FIG. 1.

As shown, a representative buy-write transaction includes purchasing a portfolio consisting of the S&P 500® stocks, e.g., when the S&P 500® is at 1198.63. At the same time, S&P 500® Index call options are sold slightly out-of-the-money, in this example, with a strike price of 1200, for a premium of $14.41. The premium effectively protects the seller from losses in the event the S&P 500® drops in value to as low as the downside breakeven point 12 of 1184.22 (i.e., up to a loss of the premium received). Alternatively, if the S&P 500® remains steady at about 1198, or increases to as high as the strike price (1200 in this example) then the option will expire, effectively valueless, and the seller will have profited by the premium amount.

Figure 2:
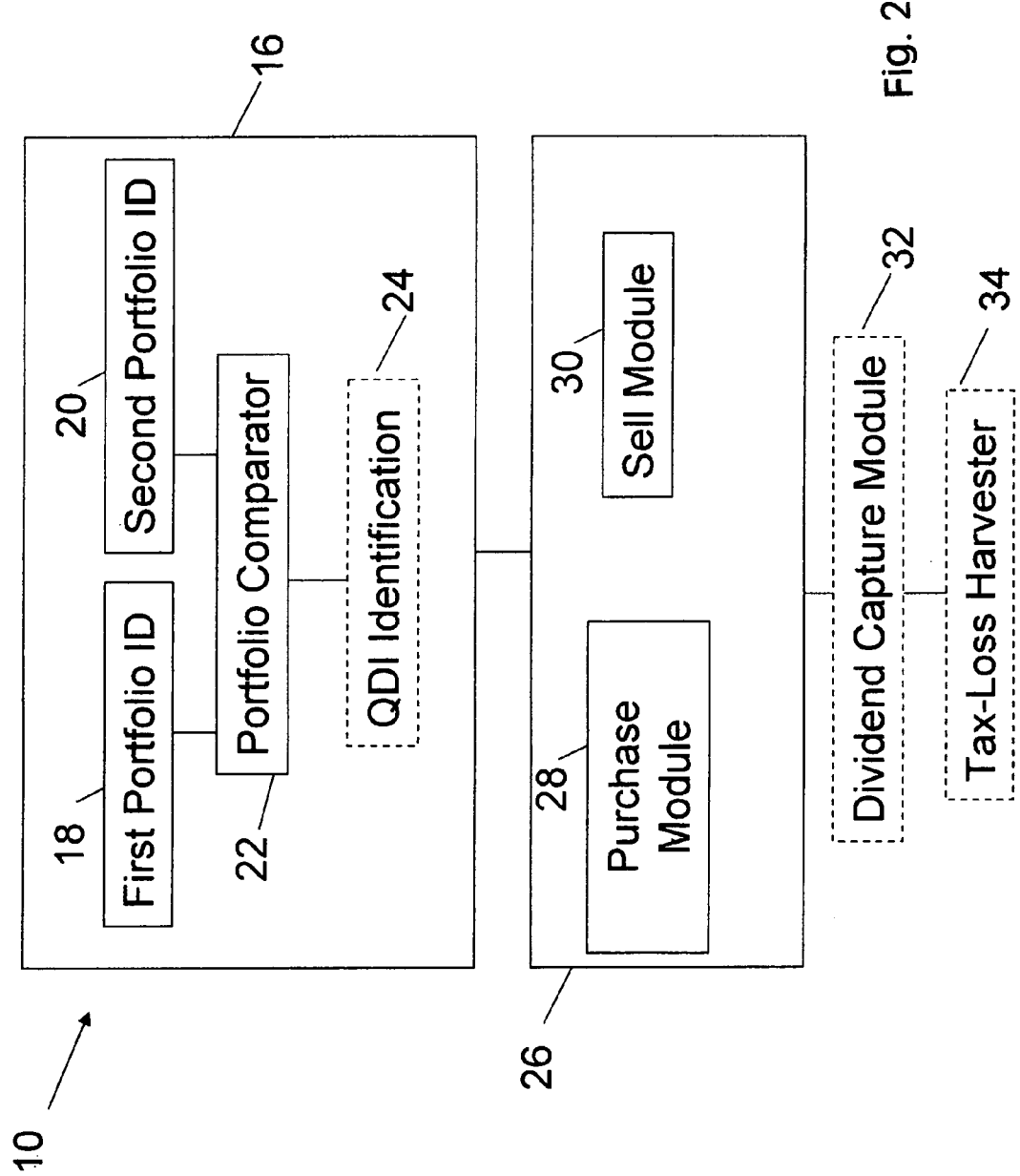
FIG. 2 is a functional block diagram of system embodying aspects of the present invention, with optional portions shown in phantom.

Referring now to FIG. 2, in a representative embodiment of the present invention, a trust series or mutual fund system 10, includes a Portfolio Selection module 16 having a First Portfolio Identification (ID) module 18 and a Second Portfolio Identification (ID) Module 20. Module 16 also includes a Portfolio Comparator 22.

Modules 18 and 20 operate in conjunction with Comparator 22 to identify an index representing a first portfolio of securities, and a second portfolio of securities expected to have similar characteristics (e.g., performance, risk, etc.) to that of the index, while having less than 70 percent overlap therewith. The list of companies or other issuers of securities of the second portfolio thus includes less than 70 percent overlap with those of the first portfolio. This limited overlap is intended to avoid straddle treatment under federal tax law as discussed in greater detail hereinbelow.

System 10 also includes a transaction module 26 which may include a purchase module 28 and sell module 30. Once the first and second portfolios have been selected, purchase module 28 may be actuated to direct, and/or to automatically effect, the purchase of securities of the second portfolio. Sell module 30 may also be actuated to direct, and/or to automatically effect, the writing of index call options on securities of the first portfolio. System 10 thus facilitates taking long positions in assets of one portfolio, while writing index call options on another similarly performing portfolio.

Since the first and second portfolios have been selected to perform similarly, the call options effectively hedge the long positions taken in the second portfolio. Moreover, gain (and/or loss) realized by such an approach would avoid the generally tax-disadvantageous 'straddle' treatment under federal tax law, since the overlap of these portfolios is less than 70 percent.

In particular embodiments of the present invention, the first portfolio (identified by module 18), may be represented by a conventional stock index such as the S&P 500® Index (SPX). Sell Module 30 may then direct the writing of call options on this index (commonly known as 'index call options' or 'section 1256 contracts').

Advantageously, this use of index call options provides potential tax advantages, since gain or loss on such 'section 1256 contracts' is currently treated as 60 percent long term and 40 percent short term, regardless of holding period. Still further, many index call options are cash-settled, which enables the writer to simply pay cash to the extent the index exceeds the exercise price on the option valuation date. This aspect may tend to reduce transaction costs, such as brokerage commissions, which may otherwise become significant in the event many call options are sold in relatively quick succession.

Both the tax treatment and the low transaction costs of cash-settled index call options may be particularly useful in various embodiments of this invention. These aspects enable system 10 to prescribe the sale of a relatively large number of call options in relatively short periods of time with relatively short term expiration dates, while still qualifying for some long term tax treatment.

For example, system 10 may prescribe the writing of cash-settled index call options slightly 'out of the money', i.e., with their exercise prices slightly above the current level of the index at the time the options are written. The skilled artisan will recognize that with other factors being equal, the premiums received for the call options tend to decrease as the exercise price is moved further out-of-the-money, due to the associated decrease in risk that the options will be exercised. Accordingly, the writer may choose the exercise price of the call options based upon a desired balance of premium and risk.

In particular embodiments, the index call options are written serially, with relatively short term expirations, so that new options are continuously written as existing options expire. This approach advantageously provides a constant hedge against a drop in value of the second portfolio (as identified by portfolio ID module 20).

While longer term options may be used, the use of the aforementioned shorter term index call options tends to provide reasonable premium income (such as by writing options having exercise prices relatively close to current index prices) while reducing the risk of being surprised by dramatic fluctuations in market prices. This advantage is thus provided even while maintaining favorable long term tax treatment for at least a portion of the net option gains generated thereby.

Although index call options may be desired for many embodiments of system 10, these may be supplemented with other call options written on individual stocks within or outside of the first portfolio. For example call options may be written on individual stocks outside of the first (index) portfolio. The premiums on these call options would provide additional cash flow, and would also qualify for long term tax treatment if the options positions are settled by delivering stock held long.

Thus, the premiums received on the sale of call options provide the trust series with income even in the event the second asset portfolio declines in value. Moreover, the use of index call options, regardless of duration, advantageously permits 60 percent of the net premium income to be treated as long-term gain for federal income tax purposes.

System 10 may also be provided with an optional QDI identification module 24. This module may be used in combination with second portfolio ID module 20, to select securities for the second portfolio which generate dividend income that may qualify for taxation at rates applicable to long term capital gain (Qualified Dividend Income—QDI). System 10 may then simply hold (or direct the user to hold) these QDI assets for a predetermined holding period so that the QDI received may be eligible for optimal tax treatment (e.g., 15 percent maximum federal taxation under current tax law).

Still further, system 10 may include a dividend capture module 32 which directs, and/or automatically effects the purchase and sale of QDI-paying assets serially, to maximize QDI received. Module 32 may also operate in conjunction with a tax-loss harvester 34 to customize the timing of the purchase and sale of the QDI-paying stocks. The QDI-paying asset(s) may then be sold as soon as possible after QDI payment, such as to potentially realize any capital loss that may be associated with a drop in share price subsequent to the dividend payment. Such a capital loss thus may be used to offset other gains, such as from index call option premiums and/or other assets sold.

Those skilled in the art will recognize, in light of the teachings hereof, that tax-loss harvester 34 may also be used to customize the timing of the purchase and sale of non QDI-paying stocks, without departing from the spirit and scope of the present invention.

Having described various embodiments of the present invention, representative operation thereof will be described in conjunction with Table I.

TABLE I

| | |
|---|---|
| 40 | Identify second and first portfolios having similar characteristics and less than seventy percent overlap. |
| 42 | Select a stock index for first portfolio. |
| 44 | Optionally, rank securities in the first portfolio. |
| 45 | Optionally, identify QDI-paying securities in step 44. |
| 46 | Optionally, place up to the highest ranking sixty-nine percent of the securities of the first portfolio into the second portfolio. |
| 48 | Analyze supplementary list of securities not found within the first portfolio. |
| 50 | Optionally, rank the supplementary list. |
| 51 | Optionally, identify QDI-paying securities in step 50. |
| 52 | Add securities of the supplementary list to the second portfolio. |
| 54 | Take long positions in second portfolio. |

TABLE I-continued

| | |
|---|---|
| 56 | Write index call options on first portfolio. |
| 58 | Optionally write other call options on first portfolio. |
| 62 | Optionally repeat steps 56/58 serially. |
| 64 | Optionally, purchase QDI-paying assets. |
| 66 | Hold QDI-paying assets for predetermined holding period. |
| 68 | Sell QDI-paying assets with optimal tax treatment. |
| 70 | Optionally, effect steps 64-68 so that the QDI-paying assets are sold shortly after QDI payment. |

As shown, modules 18 and 20, and Comparator 22 are used to identify 40 two portfolios of securities expected to have similar characteristics (e.g., performance, risk, etc.), while having less than seventy percent overlap with one another.

In particular representative embodiments, this identification 40 includes selecting 42 a conventional stock index, such as the S&P 500® Index (SPX). The securities of the first portfolio may then be ranked 44 according to predetermined criteria (e.g., market capitalization, price to earnings ratio, historical performance, including volatility, etc.). Optionally, ranking 44 may include identifying 45 those that generate Qualified Dividend Income (QDI), e.g., using QDI Identification module 24. Once so ranked, module 16 may place 46 up to the highest ranked sixty-nine percent of the first portfolio into the second portfolio.

In these representative embodiments, module 16 then analyzes 48 and ranks a supplementary list of securities which are not found within the index. Module 16 may then rank 50 these securities according to nominally the same criteria used to rank those of the index. In this manner, module 16 identifies securities having characteristics similar to those of the first portfolio (e.g., SPX) but which are not included therein. The balance of the second portfolio may then filled 52 with the highest ranking of these supplementary securities.

Optionally, ranking step 50 may include identifying 51 those that generate Qualified Dividend Income (QDI), e.g., using QDI Identification module 24. QDI-paying securities may thus be identified and included within the second portfolio, e.g., in steps 46 and/or 52.

Once the second and first portfolios have been selected, securities of the second portfolio are purchased 54, e.g., using Purchase module 28. Index call options may also be written 56 on securities of the first portfolio, e.g., using sell module 30. Optionally, step 56 includes writing 58 other call options as discussed above. As a further option, these call options may be written serially 62, e.g., with relatively short term expirations, so that new options are continuously written as existing options expire.

As another option, QDI-paying assets may be serially purchased 64, held 66 for a holding period predetermined to ensure receipt of QDI eligible for optimal tax treatment, and then sold 68, such as using dividend capture module 32. Still further, in particular embodiments, tax-loss harvester 34 may be used to time 70 the purchase and sale of the QDI-paying assets, so that the majority of the predetermined holding period is completed prior to the expected QDI payment. The QDI-paying asset(s) may then be sold shortly after QDI payment, such as to realize any capital loss that may be associated with a drop in share price occasioned by the dividend payment. Such a capital loss thus may be used to offset other gains, such as from index call option premiums and/or other assets sold.

Although exemplary embodiments of the subject invention have been shown and described with particular modules or components, those skilled in the art should recognize that one or more of these exemplary modules and/or functions performed thereby may be performed and/or supplied to these embodiments by third parties or otherwise related or unrelated separate entities, without departing from the spirit and scope of the present invention.

Moreover, although embodiments of the present invention have been shown and described with respect to the writing of call options primarily out-of-the-money, such options may also be written in-the-money, without departing from the spirit and scope of the present invention.

In the preceding specification, the invention has been described with reference to specific exemplary embodiments thereof. It will be evident that various modifications and changes may be made thereunto without departing from the broader spirit and scope of the invention as set forth in the claims that follow. The specification and drawings are accordingly to be regarded in an illustrative rather than restrictive sense.

Having thus described the invention, what is claimed is:

1. A computer implemented method of administering a tax-managed, buy-write investment fund having a plurality of units available for sale to the public, the method comprising:
   (a) Identifying, electrically, an index representing a first portfolio of assets having desired performance characteristics;
   (b) configuring, electrically, a second portfolio of assets having performance characteristics similar to those of the first portfolio;
   (c) configuring, electrically, the second portfolio to have less than 70 percent overlap with the first portfolio;
   (d) purchasing shares of the second portfolio; and
   (e) writing index call options against the first portfolio;
   wherein the identifying (a), configuring (b), configuring (c), purchasing (d) and writing (e) are performed using a computer.

2. The method of claim 1, wherein said writing (e) is effected serially, so that subsequent index call options are written upon expiration of previous index call options.

3. The method of claim 1, wherein said configuring (b) comprises placing Qualified Dividend Income (QDI)-paying assets within the second portfolio.

4. The method of claim 3, wherein said configuring (b) comprises holding the QDI-paying assets for a predetermined holding period.

5. The method of claim 4, wherein said configuring (b) comprises selling the QDI-paying assets after QDI payment.

6. The method of claim 5, wherein said configuring (b) comprises serially repeating said holding and said selling.

7. The method of claim 5, wherein said holding comprises front loading the holding period so that a majority of the holding period occurs prior to QDI payment.

8. The method of claim 7, comprising harvesting tax losses by selling the QDI-paying assets upon a drop in price of the QDI-paying assets after QDI payment.

9. The method of claim 1, wherein said configuring (c) comprises ranking assets in the first portfolio.

10. The method of claim 9, wherein said configuring (c) comprises placing up to the highest ranking sixty-nine percent of the securities of the first portfolio into the second portfolio.

11. The method of claim 10, wherein said configuring (c) comprises analyzing a supplementary list of securities not found within the first portfolio.

12. The method of claim 11, comprising ranking the securities in the supplementary list.

13. The method of claim 12, wherein said ranking the securities in the supplemental list comprises identifying QDI-paying securities.

14. The method of claim 11, comprising adding securities in the supplementary list to the second portfolio.

15. The method of claim 1, wherein said call options are written out of the money.

16. The method of claim 1, comprising writing other call options on assets other than those of the index.

17. The method of claim 16, wherein the other call options are on assets other than those of the first and second asset portfolios.

18. The method of claim 16, wherein said other call options are written further out of the money than said call options.

19. The method of claim 1, wherein at least a portion of gain received from the sale of the index call options is treated as long-term gain, regardless of holding period.

20. The method of claim 1, wherein the index comprises the S&P 500® Index (SPX).

21. A computer-implemented system for administering a tax-managed, buy-write investment fund having a plurality of units available for sale to the public, the system comprising:
    a computer using a first portfolio identification (ID) module to identify an index representing a first portfolio of assets having desired characteristics;
    a computer using a second portfolio identification (ID) module to identify a second portfolio of assets having characteristics similar to those of the first portfolio;
    a computer using a portfolio comparator to ensure the second portfolio has less than 70 percent overlap with the first portfolio;
    a computer using a purchase module to direct the purchase of shares of the second portfolio; and
    a computer using a write module to direct the writing of index call options against the first portfolio.

22. The system of claim 21, comprising a tax loss harvester using said computer to time the purchase and sale of assets to capture tax losses.

23. The system of claim 21, comprising a Qualified Dividend Income (QDI) Identification module using said computer to identify QDI-paying assets.

24. The system of claim 23, comprising a dividend capture module using said computer to direct the purchase of QDI-paying assets prior to QDI payment, the holding of the QDI-paying assets for a predetermined holding period, and the sale of the QDI-paying assets after QDI payment.

25. The system of claim 24, comprising a tax loss harvester using said computer to direct the sale of QDI-paying assets upon a drop in price of the QDI-paying assets after QDI payment.

26. An article of manufacture for administering a tax-managed, buy-write investment fund having a plurality of units available for sale to the public, said article of manufacture comprising a computer usable medium having an executable computer readable program code embodied therein, said computer readable program code configured for:
    identifying an index representing a first portfolio of assets having desired performance characteristics;
    configuring a second portfolio of assets having performance characteristics similar to those of the first portfolio;
    configuring the second portfolio to have less than 70 percent overlap versus as the first portfolio;
    purchasing shares of the second portfolio; and
    writing index call options against the first portfolio.

* * * * *